(12) United States Patent
Curello et al.

(10) Patent No.: US 7,329,348 B2
(45) Date of Patent: Feb. 12, 2008

(54) FUEL CELL SYSTEM INCLUDING AN ION FILTER

(75) Inventors: Andrew J. Curello, Hamden, CT (US);
Floyd Fairbanks, Naugatuck, CT (US);
David L Reichert, Boothwyn, PA (US)

(73) Assignee: Societe BIC, Clichy Cedex ( * ) Notice: Subject to any disclaimer, the term of this patent is extended or adjusted under 35 U.S.C. 154(b) by 0 days.

(21) Appl. No.: 10/725,235

(22) Filed: Dec. 1, 2003

(65) Prior Publication Data

US 2005/0115882 A1   Jun. 2, 2005

(51) Int. Cl.
*B01D 29/00*   (2006.01)
*H01M 8/00*   (2006.01)

(52) U.S. Cl. ............... 210/251; 210/263; 210/282; 210/502.1; 429/13

(58) Field of Classification Search .......... 210/251, 210/263, 282, 502.1; 429/13
See application file for complete search history.

(56) References Cited

U.S. PATENT DOCUMENTS

| | | | |
|---|---|---|---|
| 4,038,365 A * | 7/1977 | Patil et al. | 423/161 |
| 6,265,093 B1 | 7/2001 | Surampudi et al. | 426/13 |
| 6,503,378 B1 | 1/2003 | Fisher | 204/296 |
| 6,630,265 B1 | 10/2003 | Taft, III et al. | 429/33 |
| 6,630,518 B1 | 10/2003 | Paronen | 521/50.5 |
| 6,670,403 B2 | 12/2003 | Fisher | 521/27 |
| 6,723,460 B2 * | 4/2004 | Derflinger et al. | 429/13 |
| 2003/0064258 A1 | 4/2003 | Pan et al. | 429/13 |
| 2003/0175569 A1 | 9/2003 | Inagaki et al. | 429/30 |

* cited by examiner

Primary Examiner—Chester T. Barry
(74) Attorney, Agent, or Firm—The H.T. Than Law Group

(57) ABSTRACT

The present invention is directed to a fuel supply and fuel system with an ion filter and an ion gauge. The filter can be made from discrete pieces of polymeric filter material. The polymeric filter material is substantially the same as the proton exchange membrane or polymer electrolyte membrane (PEM) in the fuel cell. The ion gauge measures the level of ions in the fuel by measuring a voltage across a section of fuel or a current through the same section. The voltage or current is related to the ion level in the fuel.

24 Claims, 3 Drawing Sheets

FUEL CELL SYSTEM INCLUDING AN ION FILTER

FIELD OF THE INVENTION

This invention generally relates to fuel systems using fuel cells and fuel cartridges, and more particularly this invention relates to an ion filter incorporated into such systems.

BACKGROUND OF THE INVENTION

Fuel cells are devices that directly convert chemical energy of reactants, i.e., fuel and oxidant, into direct current (DC) electricity. For an increasing number of applications, fuel cells are more efficient than conventional power generation, such as combustion of fossil fuel and more efficient than portable power storage, such as lithium-ion batteries.

In general, fuel cell technologies include a variety of different fuel cells, such as alkali fuel cells, polymer electrolyte fuel cells, phosphoric acid fuel cells, molten carbonate fuel cells, solid oxide fuel cells and enzyme fuel cells. Today's more important fuel cells can be divided into three general categories, namely fuel cells utilizing compressed hydrogen ($H_2$) as fuel, proton exchange membrane or polymer electrolyte membrane (PEM) fuel cells that use methanol ($CH_3OH$), sodium borohydride ($NaBH_4$), hydrocarbons (such as butane) or other fuels reformed into hydrogen fuel, and PEM fuel cells that use methanol ($CH_3OH$) fuel directly ("direct methanol fuel cells" or DMFC). Compressed hydrogen is generally kept under high pressure, and is therefore difficult to handle. Furthermore, large storage tanks are typically required, and cannot be made sufficiently small for consumer electronic devices. Conventional reformat fuel cells require reformers and other vaporization and auxiliary systems to convert fuels to hydrogen to react with oxidant in the fuel cell. Recent advances make reformer or reformat fuel cells promising for consumer electronic devices. DMFC, where methanol is reacted directly with oxidant in the fuel cell, is the simplest and potentially smallest fuel cell, and also has promising power application for consumer electronic devices.

DMFC for relatively larger applications typically comprises a fan or compressor to supply an oxidant, typically air or oxygen, to the cathode electrode, a pump to supply a water/methanol mixture to the anode electrode and a membrane electrode assembly (MEA). The MEA typically includes a cathode, a PEM and an anode. During operation, the water/methanol liquid fuel mixture is supplied directly to the anode, and the oxidant is supplied to the cathode. The chemical-electrical reaction at each electrode and the overall reaction for a direct methanol fuel cell are described as follows:

Half reaction at the anode:

$$CH_3OH + H_2O \rightarrow CO_2 + 6H^+ + 6e^-$$

Half reaction at the cathode:

$$O_2 + 4H^+ + 4e^- \rightarrow 2H_2O$$

The overall fuel cell reaction:

$$CH_3OH + 1.5O_2 \rightarrow CO_2 + 2H_2O$$

Due to the migration of the hydrogen ions ($H^+$) through the PEM from the anode through the cathode and due to the inability of the free electrons ($e^-$) to pass through the PEM, the electrons must flow through an external circuit, which produces an electrical current through the external circuit. The external circuit may be any useful consumer electronic devices, such as mobile or cell phones, calculators, personal digital assistants and laptop computers, among others. DMFC is discussed in U.S. Pat. Nos. 5,992,008 and 5,945,231, which are incorporated by reference in their entireties. Generally, the PEM is made from a polymer, such as Nafion® available from DuPont, which is a perfluorinated sulfonic acid polymer having a thickness in the range of about 0.05 mm to about 0.50 mm, or other suitable membranes.

The electrochemical cell reactions take place at a membrane electrode assembly typically comprised of an anode diffusion layer, comprised of a carbon paper support treated with a fluoropolymer, such as Teflon® available from DuPont, an anode catalyst layer comprised of catalyst, such as platinum-ruthenium, and a proton conductor, such as Nafion® perfluorinated sulfonic acid polymer, the PEM, a cathode catalyst layer comprised of catalyst, such as platinum and a proton conductor and a cathode diffusion layer comprised of a carbon paper support treated with a fluoropolymer.

The cell reaction for a sodium borohydride reformer fuel cell is as follows:

$$NaBH_4(aqueous) + 2H_2O \rightarrow (\text{heat or catalyst}) \rightarrow 4(H_2) + (NaBO_2)(aqueous)$$

$$H_2 2H^+ + 2e^- (\text{at the anode})$$

$$2(2H^+ + 2e^-) + O_2 \rightarrow 2H_2O (\text{at the cathode})$$

Suitable catalysts include platinum and ruthenium, among other metals. The hydrogen fuel produced from reforming sodium borohydride is reacted in the fuel cell with an oxidant, such as $O_2$, to create electricity (or a flow of electrons) and water byproduct. Sodium borate ($NaBO_2$) byproduct is also produced by the reforming process. Sodium borohydride fuel cell is discussed in United States published patent application No. 2003/0082427, which is incorporated herein by reference.

Cations other than protons reduce the conductivity of the PEM. Especially damaging to the membrane conductivity are multivalent metal ions which tend to get trapped in the PEM. When the conductivity is sufficiently reduced or when the level of trapped ions reaches a threshold level, the PEM has to be replaced or refurbished.

The patent literature discloses a number of filters for fuel cells. U.S. Pat. No. 6,265,093 B1 discloses a direct methanol feed fuel cell system that includes a fuel filter located in front the MEA. This filter is a sieve-type filter that traps particles based on particle size to remove hydrocarbon impurities from the fuel. U.S. Pat. No. 6,630,518 B1 discloses a polymer membrane that is irradiated and then sulfonated to link the sulfonic acid group to the membrane. The membrane is usable as the PEM in fuel cells and is usable as ion-exchange member or in ion-selective purification systems, among other uses.

Therefore, a need exists for a filter that reduces metal ion concentration in fuel for use in a fuel cell.

SUMMARY OF THE INVENTION

The present invention is directed to an ion filter, which can be positioned at any location in the fluidic system of a fuel cell.

The present invention is directed to a filter for use with a fuel cell comprising an inlet, an outlet and a medium made from a perfluorinated sulfonic acid polymer and disposed between the inlet and the outlet. The fuel exiting the filter contains less metal ion particles than fuel entering the filter. The perfluorinated sulfonic acid polymeric medium is substantially similar to the polymer electrolyte membrane or proton exchange membrane in the membrane electrode assembly of the fuel cell.

The filter can be connected to a fuel supply or to a fuel cell component. The filter may also have a housing that encases the filter medium, and the filter medium can be shredded or can be in the form of ingots to increase the surface area of the medium.

The present invention is further directed to a fuel supply for a fuel cell comprising an outer casing containing fuel with a first amount of ions therein, and an ion filter supported by the casing. The ion filter is in fluid communication with fuel so that the fuel exiting the ion filter has a second amount of ions less than the first amount of ions. This ion filter is substantially similar to the ion filter described above.

The present invention is also directed to a perfluorinated sulfonic acid polymer filter medium adapted to attract metal ions from fuel usable in a fuel cell and from liquid byproduct produced in the fuel cell. The filter medium is substantially similar to the polymer electrolyte membrane in the membrane electrode assembly of the fuel cell, and the filter medium is positioned within the fluidic flow path related to the fuel cell, e.g., the fuel cartridge, the mixing chamber and/or the byproduct chamber.

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION OF THE PREFERRED EMBODIMENTS

Figure 1:
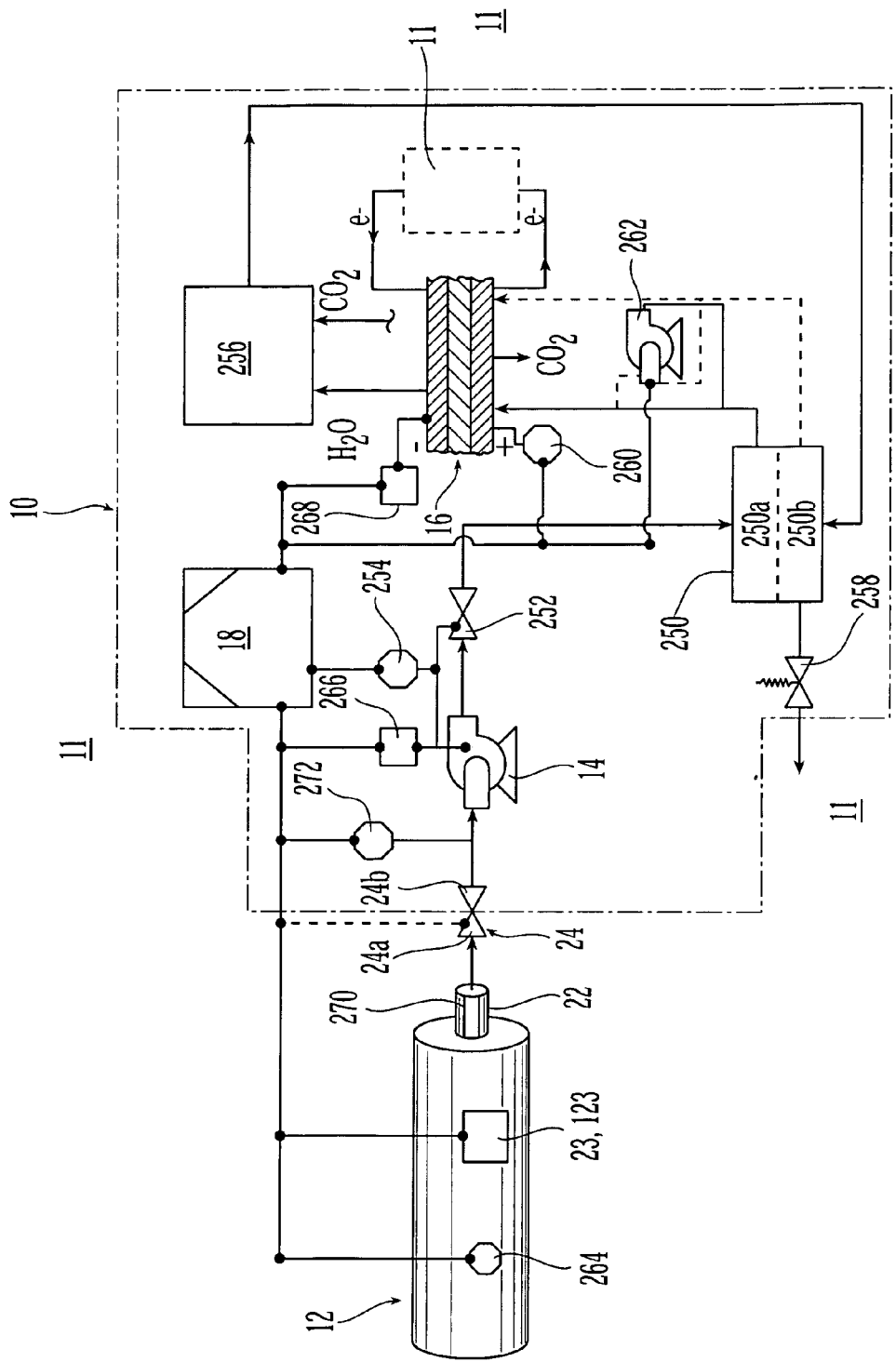
FIG. 1 is a schematic view of a fuel cell system with a fuel cartridge, an ion filter and ion gauge in accordance with the present invention.

As illustrated in the accompanying drawings and discussed in detail below, the present invention is directed to a fuel supply, which stores fuel cell fuels such as methanol and water, methanol/water mixture, methanol/water mixtures of varying concentrations or pure methanol. Methanol is usable in many types of fuel cells, e.g., DMFC, enzyme fuel cell, reformat fuel cell, among others. The fuel supply may contain other types of fuel cell fuels, such as ethanol or alcohols, chemicals that can be reformatted into hydrogen, or other chemicals that may improve the performance or efficiency of fuel cells. Fuels also include potassium hydroxide (KOH) electrolyte, which is usable with metal fuel cells or alkali fuel cells, and can be stored in fuel supplies. For metal fuel cells, fuel is in the form of fluid borne zinc particles immersed in a KOH electrolytic reaction solution, and the anodes within the cell cavities are particulate anodes formed of the zinc particles. KOH electrolytic solution is disclosed in United States published patent application No. 2003/0077493, entitled "Method of Using Fuel Cell System Configured to Provide Power to One or more Loads," published on Apr. 24, 2003, which is incorporated herein by reference in its entirety. Fuels also include a mixture of methanol, hydrogen peroxide and sulfuric acid, which flows past a catalyst formed on silicon chips to create a fuel cell reaction. Fuels also include aqueous sodium borohydride ($NaBH_4$) and water discussed above. Fuels further include hydrocarbon fuels, which include, but are not limited to, butane, kerosene, alcohol and natural gas, disclosed in United States published patent application No. 2003/0096150, entitled "Liquid Hereto-Interface Fuel Cell Device," published on May 22, 2003, which is incorporated herein by reference in its entirety. Fuels also include liquid oxidants that react with fuels. The present invention is, therefore, not limited to any type of fuels, electrolytic solutions, oxidant solutions or liquids contained in the supply. The term "fuel" as used herein includes all fuels that can be reacted in fuel cells or in the fuel supply, and includes, but is not limited to, all of the above suitable fuels, electrolytic solutions, oxidant solutions, liquids, and/or chemicals and mixtures thereof.

As used herein, the term "fuel supply" includes, but is not limited to, disposable cartridges, refillable/reusable cartridges, containers, cartridges that reside inside the electronic device, removable cartridges, cartridges that are outside of the electronic device, fuel tanks, fuel refilling tanks, other containers that store fuel and the tubings connected to the fuel tanks and containers. While a cartridge is described below in conjunction with the exemplary embodiments of the present invention, it is noted that these embodiments are also applicable to other fuel supplies and the present invention is not limited to any particular type of fuel supplies.

In accordance with one aspect of the present invention, the fuel cell system possesses an ability to filter the fuel to significantly reduce the metal ion particles in the fuel. As illustrated in the accompanying drawings and discussed in detail below, the present invention is directed to a fuel cell 10 for powering electronic device 11.

FIG. 1 illustrates one embodiment of the present invention and the fuel cell system contains two sets of connecting lines. The first set of connecting lines comprises fluid, i.e., liquid and gas, lines, which have arrows to show the direction of flow. The second set of connecting lines comprises electrical lines, which have darkened circles at the intersections to show electrical connectivity. While this embodiment is described with respect to direct methanol fuel cell, it is understood that this embodiment is suitable for any fuel cell.

Cartridge 12 is connected to fuel cell 10, which powers electronic device 11. Cartridge 12 can be formed with or without an inner liner or bladder. Cartridges without liners and related components are disclosed in co-pending U.S. patent application Ser. No. 10/356,793, entitled "Fuel Cartridge for Fuel Cells," filed on Jan. 31, 2003. The '793 application is incorporated herein by reference in its entirety. Cartridges with inner liners or bladders are disclosed in co-pending U.S. patent application Ser. No. 10/629,004, entitled "Fuel Cartridge with Flexible Liner," filed on Jul. 29, 2003. The '004 application is also incorporated herein by reference in its entirety. The fuel cell system shown in FIG. 1 is fully described in co-pending U.S. patent application entitled "Fuel Cell System including Information Storage Device and Control System," filed on even date herewith. This co-pending application is incorporated herein by reference in its entirety.

Electronic device 11 is typically larger than fuel cell 10 and usually houses the fuel cell. In FIG. 1, electronic device 11 is shown schematically to surround fuel cell 10. It is also represented by a box drawn by broken lines and is powered by the electrical current produced by MEA 16. The electrical device can also be a charger that recharges batteries.

With respect to the fluidic circuit, the fuel cartridge is connected to valve 24, which preferably is a two-component valve. Valve component 24a is attached to the cartridge and valve component 24b is connected to pump 14. Each valve component is capable of forming a seal when the fuel cartridge is separated from the fuel cell. Two component valves are fully disclosed in co-pending patent application Ser. No. 10/629,006 entitled "Fuel Cartridge with Connecting Valve," filed on Jul. 29, 2003. This patent application is also incorporated herein by reference in its entirety.

Inside fuel cell 10, valve component 24b may directly connect to pump 14 and provides a seal for pump 14, when the fuel cartridge is disconnected. Alternatively, valve component 24b may be attached to other fuel cell components. Pump 14 is connected to optional valve 252, which functions as a flow regulating device, and the flow rate through pump 14 and valve 252 can be measured with flow meter 254, such as a Venturi meter or other electronic flow meters. Fuel is then pumped into mixing chamber 250. From mixing chamber 250, fuel/water mixture is pump directly to MEA 16 to generate electricity to power electrical device 11. Liquid and gas byproducts, e.g., water and carbon dioxide, can be pumped or flowed under pressure from the carbon dioxide gas to byproduct chamber 256. The water byproduct is then transported back to mixing chamber 250. Mixing chamber 250 has relief valve 258 to vent the gas byproduct and excess water outside the fuel cell. Relief valves can be poppet-type valve disclosed in the '004 application. The water is mixed with fuel in mixing chamber 250 to achieve an optimal fuel concentration. Fuel concentration is measured by fuel concentration sensor 260, and these sensors are disclosed in United States patent publication Nos. 2003/0131663 and 2003/0134162 and in U.S. Pat. Nos. 6,254,748 and 6,306,285. These references are incorporated by reference herein.

When pressurized fuel supplies are used, pump 14 may be omitted. In this embodiment, regulating valve 252 regulates the flow of fuel to MEA 16. Regulating valve 252 is fully disclosed in co-pending patent application entitled "Fuel Cell System including Information Storage Device and Control System."

Alternatively, the byproducts, except for the water required for the fuel cell reaction, are transferred back to fuel cartridge 12 for disposal. Relief valve 258 can be disposed on the fuel cartridge to vent the gas byproduct to atmosphere. Furthermore, byproduct chamber 256 can be omitted and the byproducts are transported directly from MEA 16 to mixing chamber 250. In an alternative embodiment, chamber 250 can be divided into two portions as illustrated by the broken line in chamber 250. Chamber 250a is adapted to receive fuel from the fuel cartridge and chamber 250b is adapted to receive the byproducts. Each chamber 250a and 250b is individually connected directly to MEA 16 or to another mixing chamber upstream of the MEA. Each chamber 250a, 250b can be individually connected to a pump, e.g., pump 262, to regulate the flow from each chamber to the MEA to obtain optimal fuel concentration.

With respect to the control circuit, which is fully discussed in co-pending patent application entitled "Fuel Cell System including Information Storage Device and Control System," controller 18 is setup to control the flow of fuel through the fuel cell. Controller 18 can be positioned within fuel cell 10 or in electronic device 11. The controller can also be positioned on the fuel cartridge, or the functions of the controller can be performed by the central processing unit (CPU) or controller of the electronic device 11. Controller 18 can read information stored on information storage devices 23, 266, 268 and write information to these information storage devices. Controller 18 can also read electrically readable fuel gauge 264 to ascertain the amount of remaining fuel. Such gauge is disclosed in co-pending patent application Ser. No. 10/725,236, entitled "Fuel Gages for Fuel Cartridges," filed on even date herewith, which is incorporated herein by reference in its entirety. Controller 18 can also be connected to two-component valve 24, so that the controller can control the opening and closing of valve 24. The controller can also read sensors, such as flow meter 254, fuel concentration sensor 260 and ion sensor 272.

Controller 18 can also set the pumping rate of pump 14 or how wide regulating valve 252 should be opened to control the flow rate. The controller is also connected to optional pump 262, which pumps fuel or fuel mixture from mixing chamber 250 to the MEA, to control the flow rate. Optionally, another regulating valve, similar to valve 252, is connected to pump 262 to control the flow rate.

Figure 2:
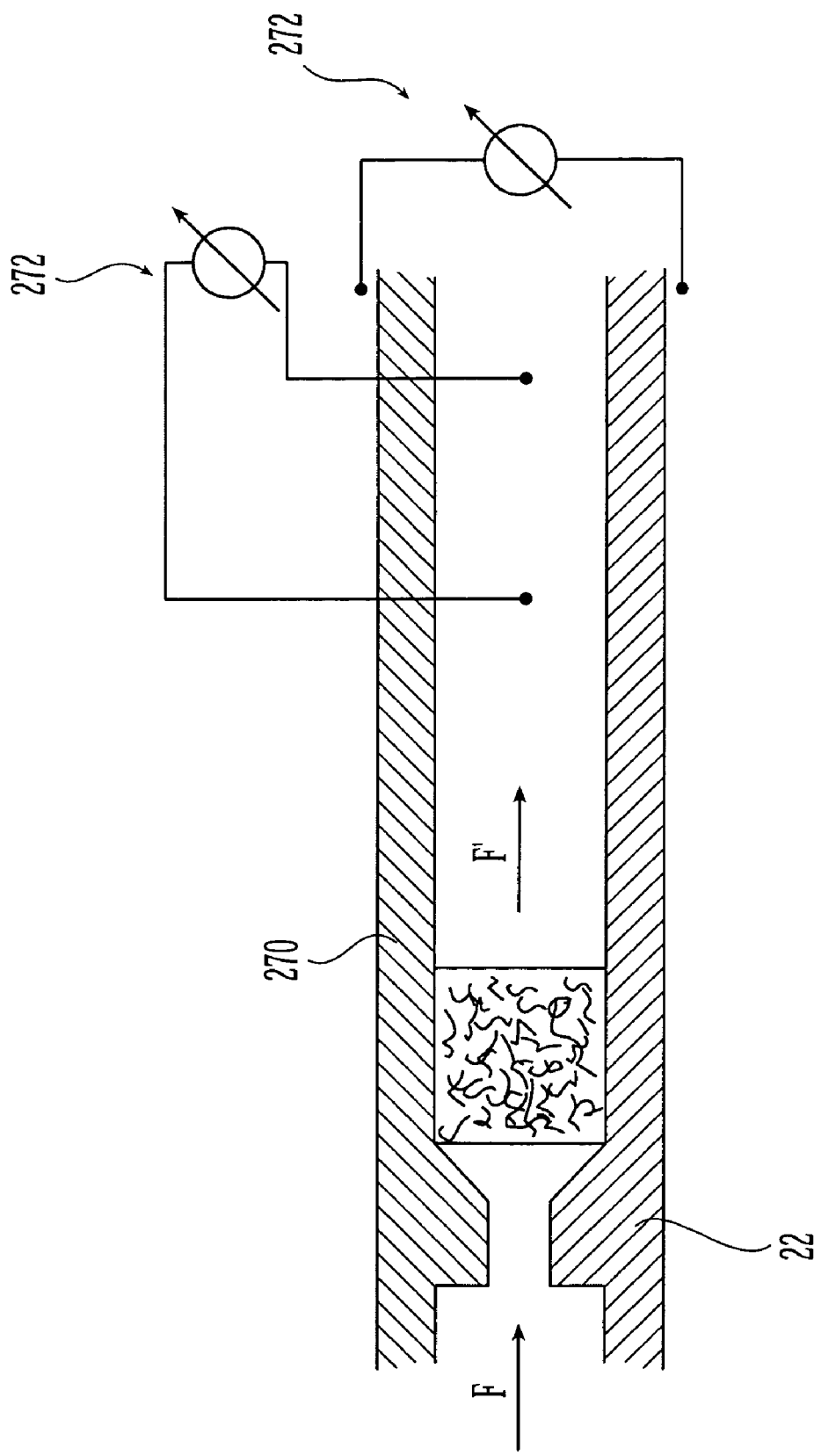
FIG. 2 is an enlarged, partial cross-sectional view of a portion of the fuel cartridge of FIG. 1 with the ion filter and a gage for measuring ion level in the fuel.

In accordance with one aspect of the present invention, an ion filter is provided to fuel cell 10 and/or cartridge 12. With reference to FIG. 2, an enlarged view of filter 270 within outlet 22 of the cartridge is shown. Filter 270, in this preferred embodiment, comprises a Nafion® perfluorinated sulfonic acid polymer (available from DuPont). Since ion particles are known to permeate and reduces the effectiveness of Nafion® polymers used as the PEM in the MEA, when the filter material is made from the substantially same material as the PEM and the filter is located upstream of the MEA, the ion particles would be attracted to the filter and be removed from the fuel before the fuel reaches the MEA. Hence, the filter material is selected to be substantially the same as the PEM material.

In the present embodiment, the polymer material is shredded into discrete pieces or be made into ingots 270a that are packed together to form filter 270. Providing a filter material of discrete pieces increases the surface area of the filter material exposed to the fuel F so that the filter can be compact and effective. Alternatively, the filter material can be provided in a fine powder or the like. In the present embodiment, the discrete polymer pieces 270a are bound together in an optional binder 270b. Suitable binders 270b should be resistant to the fuel used. Alternatively, instead of a binder, the filter material can be contained within an open mesh fuel-resistant grid such as the matrix disclosed in co-pending '004 patent application.

The metal ions in the fuel are absorbed or attracted to the filter material within the filter via diffusion so that the fuel F' exiting the filter has a second amount of ions less than the first amount of ions in the entering fuel F. Diffusion allows the filter material to collect ions when fuel flows through the filter, while requiring a relatively small pressure drop across the filter. Filter 270 does not discriminate based on particle size, and therefore is a non-sieve filter.

The density and permeability of the filter material in filter 270 determine the flow characteristics of the fuel F through the filter. Preferably, the filter material is wetted before it is assembled into the cartridge so that it expands to between about 5% to about 25% of its initial volume. More preferably, the filter material is wetted to expand to about 15% of its initial volume.

The filter material may include the one or more catalysts, such as platinum and/or ruthenium that are "unsupported," i.e., without a base material. Again, the filter material can be shredded or provided in a fine powder and used as previously discussed. The polymeric filter material can also be extruded to form a textile mat including woven and nonwoven, which is the disposed in the fuel flow path.

Figure 3:
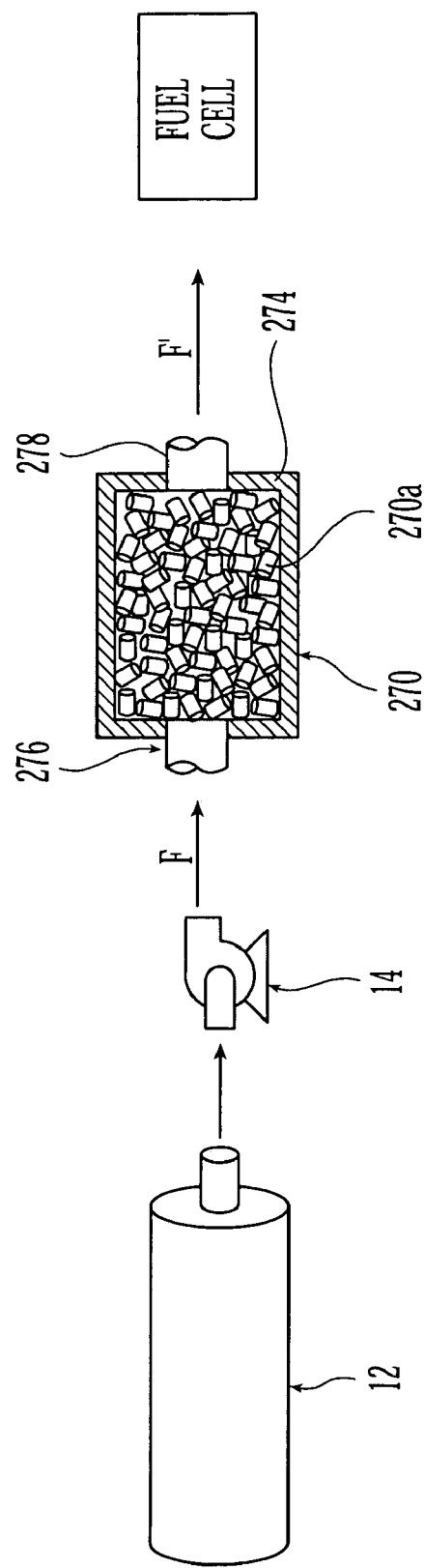
FIG. 3 is a partial schematic view of another embodiment of the fuel cell system.

Filter 270 when disposed in nozzle 22, as shown in FIG. 2, is downstream of the fuel supply and upstream of pump 14. Preferably, pump 14 transports fuel from the fuel supply and through the filter under pressure. Alternatively, as shown in FIG. 3, filter 270 is located downstream of fuel cartridge 12 and pump 14. Filter 270 may include discrete pieces 270*a* of filter material contained within housing 274. Housing 274 has inlet 276 and outlet 278. Preferably, housing 274 is made from a fuel compatible material. The filter can also be located on the cartridge. Additionally, when both filter 270 and the shut-off valve are located in nozzle 22, filter 270 also acts as a flow regulator to slow down the flow of fuel when the shut-off valve opens. Such a use of the filter and shut-off valves are fully disclosed in the co-pending '006 patent application incorporated by reference above. As a flow regulator, the filter can be positioned upstream or downstream from the shut-off valve.

Referring again to FIG. 1, in accordance to another aspect of the present invention, ion sensor 272 is provided to ascertain the effectiveness of the filter and to determine when the filter should be replaced. Ion sensor 272 is preferably located within fuel cell 10 as shown, or be disposed on the fuel cartridge. Ion sensor 272 is electrically connected with controller 18, and is readable by the controller. Ion sensor 272 applies an electrical field to the fuel, e.g., across the tube carrying fuel or within the tube, as illustrated in FIG. 2. This electrical field is either a constant voltage across the fuel or a constant current though the fuel. The electrical conductivity of the fuel depends on the concentration of ion particles in the fuel. The ion population is directly proportional to either the current flowing through the fuel if a constant voltage is applied across the fuel or the voltage across the fuel if a constant current is flowing through the fuel. A real-time ion measurement is compared to a base-line measurement of low ion fuel to determine whether the ion level is acceptable. Alternatively, a calibration curve or table can be drawn from data points representing low ion level, unacceptable ion level and one or more points therebetween. The real-time measurement can be compared to this calibration curve to ascertain the ion level during use. Controller 18 periodically reads this voltage or current and when the voltage or current reaches a predetermined level, the controller displays a message or other signal such as a visual or audible signal, to the user to change the ion filter, possibly at the next refill of the fuel supply.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). For example, filter material can be placed within cartridge 12, mixing chamber 250 and/or byproduct chamber 256 to extract metal ion particles from the fuel and/or water byproduct. Therefore, it will be understood that the appended claims are intended to cover all such modifications and embodiments, which would come within the spirit and scope of the present invention.

We claim:

1. A filter for use with a fuel cell comprising:
   an inlet, an outlet, and a medium made from perfluorinated sulfonic acid polymer and disposed between the inlet and the outlet, wherein fuel exiting the filter contains less metal ions than fuel entering the filter, wherein the perfluorinated sulfonic acid polymer is substantially similar to a polymer electrolyte membrane in the fuel cell and includes at least one catalyst.

2. The filter of claim 1 being connectable to a fuel supply.

3. The filter of claim 1 being positioned in a fuel supply.

4. The filter of claim 1 being connectable to a fuel cell.

5. The filter of claim 1 being positioned in a fuel cell.

6. The filter of claim 1 being positioned in an electronic device powered by a fuel cell.

7. The filter of claim 1 further comprising a housing encasing the medium.

8. The filter of claim 1, wherein the perfluorinated sulfonic acid polymer medium is shredded.

9. The filter of claim 1, wherein the perfluorinated sulfonic acid polymer medium is in the form of ingots.

10. The filter of claim 1, wherein the perfluorinated sulfonic acid polymer medium is made into a textile web.

11. The filter of claim 10, wherein the textile web is a nonwoven web.

12. The filter of claim 10, wherein the textile web is a woven web.

13. The filter of claim 1, wherein the perfluorinated sulfonic acid polymer medium is made into powder form.

14. The filter of claim 1, wherein the medium is wetted before use.

15. The filter of claim 1 operatively connected to a sensor to measure the electrical conductivity of the fuel.

16. The fuel supply of claim 11, wherein the at least one catalyst is unsupported by a base material.

17. The filter of claim 1, wherein the at least one catalyst comprises platinum or ruthenium.

18. A fuel supply for a fuel cell comprising:
   an outer casing containing fuel with a first amount of ions therein, and
   an ion filter supported by the casing, said ion filter is in fluid communication with said fuel, said ion filter comprises a filter material made from a perfluorinated sulfonic acid polymer and at least one catalyst and the filter material is substantially similar to a polymer electrolyte membrane in the fuel cell;
   wherein upon flowing said fuel through said ion filter, the fuel exiting the ion filter has a second amount of ions less than said first amount of ions.

19. The fuel supply of claim 18, wherein the ion filter includes discrete pieces of the filter material.

20. The fuel supply of claim 18, wherein the filter material is shredded.

21. The fuel supply of claim 18, wherein the filter material is wetted before use.

22. The fuel supply of claim 18 operatively connected to a sensor to measure the electrical conductivity of the fuel.

23. The fuel supply of claim 18, wherein the at least one catalyst is unsupported by a base material.

24. The fuel supply of claim 18, wherein the at least one catalyst comprises platinum or ruthenium.

* * * * *